United States Patent Office 3,746,643
Patented July 17, 1973

3,746,643
GREASE AND RUST INHIBITOR COMPOSITIONS
Lynn C. Rogers, Ponca City, Okla., assignor to
Continental Oil Company, Ponca City, Okla.
No Drawing. Continuation-in-part of abandoned application Ser. No. 727,720, May 8, 1968. This application Oct. 21, 1970, Ser. No. 82,825
Int. Cl. C10m 5/22, 7/38
U.S. Cl. 252—33                        26 Claims

ABSTRACT OF THE DISCLOSURE

Grease and rust inhibitor compositions consisting of 5–80 parts by weight of an oil soluble dispersing agent selected from sulfonic acids, aliphatic monocarboxylic acids, and alkaline earth metal salts thereof, 5–45 parts by weight of an alkaline earth metal carbonate, and 0.5–60 parts by weight of microcrystalline wax having a melting point in the range of from about 145° F. to about 190° F. Said compositions, also, may contain a minor amount of a nonvolatile diluent oil. Also, a solution of said compositions in a volatile solvent may be applied to coat metal surfaces.

CROSS-REFERENCE TO RELATED APPLICATIONS

The present application is a continuation-in-part of application Ser. No. 727,720, filed May 8, 1968, and now abandoned.

DISCLOSURE

Background

Grease and rust inhibitor compositions which contain highly basic metal salts have been recently manufactured. In most instances, these compositions are mineral oil solutions of an oil soluble dispersing agent salt which have dissolved or dispersed therein, a basic alkaline earth metal salt or complex thereof. Such compositions have been prepared by several procedures, some of which involve two basic process steps in which a mineral oil solution of a carbonated, basic alkaline earth metal salt is initially formed, and is then, in the second step, treated with an active hydrogen compound to yield the grease compositions. A typical two-step procedure for manufacture of such grease and rust inhibitor compositions is described in McMillen U.S. Pat. No. 3,242,079 and McMillen U.S. Pat. No. 3,372,115. Other procedures involve but a single step in which a mixture of an oil soluble dispersing agent, nonvolatile carrier, water, alcohol and alkaline earth metal carbonate complex is heated under controlled conditions to effect conversion to grease. A typical procedure of this type is described in U.S. patent application Ser. No. 727,719, and now abandoned, by Mack W. Hunt, and entitled "Method for Preparing Highly Basic Grease and Rust Inhibiting Compositions," filed concurrently with U.S. patent application Ser. No. 727,720 and assigned to the assignee of this application.

Greases and rust inhibiting compositions of the type described, for the most part, contain a large amount of nonvolatile, diluent oil which functions as a plasticizer and softening agent. The resulting greases and rust inhibitor compositions are therefore relatively soft and tacky. Where these compositions are used as surface coatings for metals, such tackiness is undesirable, both for aesthetic and safety reasons. Another problem which has been encountered with rust inhibitor compositions of the type described is the tendency of films or coatings deposited from the compositions on metal surfaces to become chalky and brittle, and ultimately to flake off and expose the metal substrate when the coating is exposed to varying conditions of weather over extended periods of time.

I have discovered that compositions consisting essentially of an oil soluble dispersing agent, an alkaline earth metal carbonate and microcrystalline wax having certain improved properties as compared to those taught by U.S. Pat. No. 3,242,079. The compositions of my invention, when used as a rust inhibitor coating have a substantial reduction in tackiness, a more durable film and provide better rust inhibition. In other words, I have discovered that replacing substantially all of the nonvolatile diluent oil of the compositions of U.S. Pat. No. 3,242,079 with a microcrystalline wax results in an improved product.

In the parent application (Ser. No. 727,720) is was considered that an organic weathering and tack reducing agent (e.g. aluminum stearate) was desirable to obtain optimum properties in the rust inhibitor compositions. Moreover, in the parent application it was considered that both paraffin wax and microcrystalline wax were suitable in the composition. I have now discovered that compositions containing microcrystalline wax are superior to compositions containing paraffin wax. Because of this microcrystalline wax is considered the only suitable wax in the present invention. Still further use of microcrystalline wax in the compositions of my invention eliminates the need for an organic weathering and tack reducing agent, such as aluminum stearate.

BRIEF DESCRIPTION OF THE INVENTION

Broadly stated, the present invention concerns a viscous, high melting point composition of matter consisting essentially of an oil soluble dispersing agent, an alkaline earth metal carbonate, and microcrystalline wax. In addition, the composition may contain a minor amount of a nonvolatile diluent oil. The composition is characterized as having a dropping point of above 500° F., an A.S.T.M. penetration, at 77° F., of less than 400 and an acetic base number of at least 50.

Described alternatively, the composition of my invention comprises an oil soluble dispersing agent, alkaline earth metal carbonate, microcrystalline wax and nonvolatile diluent oil.

In another aspect, the present invention concerns the use as a rust inhibitor of a viscous, high melting point composition consisting essentially of an oil soluble dispersing agent, an alkaline earth metal carbonate and microcrystalline wax.

In still another aspect, the present invention concerns a composition, suitable for application as a rust inhibitor, comprising a volatile hydrocarbon solvent and a viscous, high melting point composition consisting essentially of an oil soluble dispersing agent, an alkaline earth metal carbonate and microcrystalline wax.

DETAILED DESCRIPTION

Composition of my invention

The composition of my invention consists essentially of the following materials, in the range of amounts stated, as parts by weight.

| Component | Range of amounts | | |
|---|---|---|---|
| | Suitable | More suitable | Preferred |
| Oil soluble dispersing agent | 5–80 | 10–60 | 15–45 |
| Alkaline earth metal carbonate | 5–45 | 10–40 | 15–40 |
| Microcrystalline wax | 0.5–60 | 2–55 | 20–50 |

[1] Mol. wt. about 2 million.

In addition to the above materials the composition may contain from 0.5 to about 20 parts by weight, preferably from about 1 to about 15 parts by weight of a nonvolatile diluent oil.

Materials

Suitable oil soluble dispersing agents include the oil soluble sulfonic acids, carboxylic acids, and the metal salts thereof. The term "oil soluble sulfonic acids," as used herein, refers to those materials wherein the hydrocarbon portion of the molecule has a molecular weight in the range of about 300 to about 1,000. Preferably, this molecular weight is in the range of about 370 to about 700. These oil soluble sulfonic acids can be either synthetic sulfonic acids or the so-called mahogany or natural sulfonic acids. The term "mahogany sulfonic acid" is believed to be well understood, since it is amply described in the literature. The term "synthetic sulfonic acids" refers to those materials which are prepared by sulfonation of hydrocarbon feedstocks which are prepared synthetically. The synthetic sulfonic acids can be derived from either alkyl or alkaryl hydrocarbons. In addition, they can be derived from hydrocarbons having cycloalkyl (i.e., naphthenic) groups in the side chains attached to the benzene ring. The alkyl groups in the alkaryl hydrocarbons can be straight or branched chain. The alkaryl radical can be derived from benzene, toluene, ethyl benzene, xylene isomers, or naphthalene.

An example of a hydrocarbon feedstock which has been particularly useful in preparing synthetic sulfonic acids is a material known as postdodecylbenzene. Postdodecylbenzene is a bottoms product of the manufacture of dodecylbenzene. The alkyl groups of postdodecylbenzene are branched chain. Postdodecylbenzene consists of monoalkylbenzenes and dialkylbenzenes in the approximate mole ratio of 2:3 and has typical properties as follows:

| | |
|---|---|
| Specific gravity at 38° C. | 0.8649 |
| Average molecular weight | 385 |
| Percent sulfonatable | 88 |
| A.S.T.M. D-158 Engler: | |
| I.B.P., °F. | 647 |
| 5, °F. | 682 |
| 50, °F. | 715 |
| 90, °F. | 760 |
| 95, °F. | 775 |
| F.B.P., °F. | 779 |
| Refractive index at 23° C. | 1.4900 |
| Viscosity at (centistokes): | |
| −10° C. | 2800 |
| 20° C. | 280 |
| 40° C. | 78 |
| 80° C. | 18 |
| Aniline point, °C. | 69 |
| Pour point, °F. | −25 |

An example of another hydrocarbon feedstock which is particularly useful in preparing synthetic sulfonic acids is a material referred to as "dimer alkylate." "Dimer alkylate" has branched chain alkyl groups as does postdodecylbenzene. Briefly described, dimer alkylate is prepared by the following steps:

(1) Dimerization of a suitable feedstock, such as cat poly gasoline.
(2) Alkylation of an aromatic hydrocarbon with the dimer formed in step (1).

Preferably, the dimerization step uses a Friedel-Crafts alkylation sludge as the catalyst. This process and the resulting product are described in U.S. Pat. No. 3,410,925.

An example of another hydrocarbon feedstock which is particularly useful for preparing synthetic sulfonic acids which can be used in my invention is a material which I refer to as "NAB Bottoms." NAB Bottoms are predominantly di-n-alkyl aromatic hydrocarbons wherein the alkyl groups contain from 8 to 18 carbon atoms. They are distinguished primarily from the preceding sulfonation feedstocks in that they are straight chain and contain a large amount of di-substituted material. A process of preparing these materials is described in U.S. Pat. No. 3,288,716, which is concerned with an additional use for the product, other than sulfonation feedstock. Another process of preparing a di-n-alkaryl product is described in application Ser. No. 521,794, and now abandoned, filed Jan. 20, 1966, and having the same assignee as the present application.

Still another process of preparing a product containing a predominant amount of di-n-$C_8$-$C_{18}$-alkaryl hydrocarbons is described in application Ser. No. 53,352, filed July 6, 1970, now Pat. No. 3,662,012, and having the same assignee as the present application.

In order to make my disclosure even more complete, application Ser. Nos. 53,352 and 521,794 and Pats. Nos. 3,288,716 and 3,410,925 are made a part of this disclosure.

The oil soluble sulfonic acids and metal sulfonates are preferred for use in my process.

In addition to the sulfonic acids derived from the foregoing-described hydrocarbon feedstock, examples of other suitable sulfonic acids include the following: mono- and poly-wax-substituted naphthalene sulfonic acid, dinonyl naphthalene sulfonic acid, diphenyl ether sulfonic acid, naphthalene disulfide sulfonic acid, dicetyl thianthrene sulfonic acid, dilauryl beta-naphthol sulfonic acid, dicapryl nitronaphthalene sulfonic acid, unsaturated paraffin wax sulfonic acid, hydroxy substituted paraffin wax sulfonic acid, tetraamylene sulfonic acid, mono- and poly-chlorosubstituted paraffin wax sulfonic acid, nitrosoparaffin wax sulfonic acid; cylcloaliphatic sulfonic acid such as lauryl-cyclohexyl sulfonic acid, mono- and polywax substituted cyclohexyl sulfonic acid, and the like.

Suitable carboxylic acids which can be used in preparing the colloidal dispersion used as a starting material include naphthenic acids, such as the substituted cyclopentane mono-carboxylic acids, the substituted cyclohexane monocarboxylic acids and the substituted aliphatic polycyclic monocarboxylic acids containing at least 15 carbon atoms. Specific examples include cetyl cyclohexane carboxylic acids, dioctyl cyclopentane carboxylic acids, dilauryl decahydronaphthalene and stearyloctahydro indene carboxylic acids and the like and oil soluble salts thereof. Suitable oil soluble fatty acids are those containing at least 8 carbon atoms. For producing the object of this invention in liquid form, I prefer fatty acids which are liquids at ambient temperatures down to about 15° C. Specific examples include 2-ethyl hexanoic acid, pelargonic acid, oleic acid, palmitoleic acid, linoleic acid and ricinoleic acid. Naturally occurring mixtures of predominantly unsaturated fatty acids, such as tall oil fatty acids, are particularly suitable. Examples of commercially available tall oil fatty acids include the "Crofatols," available from Crosby Chemical Company and the "Acintols," available from Arizona Chemical Company.

Since commercially available sulfonic acids usually contain at least a small amount of nonvolatile diluent oil when the oil soluble dispersing agent is an oil soluble sulfonic acid small amounts of the nonvolatile diluent oil usually will be present in the final product. The amounts of these materials has been stated hereinbefore.

A wide variety of nonvolatile diluent oils are often used in conjunction with oil-soluble sulfonic acids. The principal requisite desired in the nonvolatile diluent oil is that it will act as a solvent for the dispersing agent which is used. These oils have a boiling point above about 230° C. Examples of nonvolatile diluent oils which can be used include mineral lubricating oils obtained by any of the conventional refining procedures; synthetic lubricating oils, such as polymers of propylene, polyoxyalkylenes, polyoxypropylene, dicarboxylic acid esters, and esters of phosphorous; synthetic hydrocarbon lubricating oils, such as dialkylbenzenes, diphenylalkanes, alkylated tetrahydronaphthalenes, and mixtures of these materials; vegetable oils, such as corn oil, cotton seed oil, and castor oil; and animal oils, such as lard oil and sperm oil. Of the preceding examples of nonvolatile diluent oils, the mineral lubricating oils and the synthetic lubricating oils are considered more suitable, with the mineral lubricating oils being preferred.

Microcrystalline waxes are used in the compositions of my invention. The term "microcrystalline wax" refers to a wax material which is obtained usually from the residual product of the vacuum distillation of lubricating oils. In general, microcrystalline waxes contain only very minor quantities of straight-chain paraffinic hydrocarbons and have melting points of from about 145° to about 190° F. While I believe the term microcrystalline wax is well understood in the wax art, for additional information concerning the properties and preparation thereof, I refer to U.S. Pat. No. 2,983,664, by Concetto J. Camilli.

The alkaline earth metal carbonate which is present in the compositions of my invention is (1) present in the colloidal dispersion used in the two-step procedure or (2) formed in the preparation of the product by the one-step porcedure.

The term "alkaline earth metal" as used herein refers only to those metals of this group which are more commonly available; namely, magnesium, calcium, strontium and barium. Of these, calcium and barium are more suitable, with calcium being preferred.

While we have used the term alkaline earth metal carbonate, it may be well to mention that while carbonate is definitely the predominant anion, traces of other anions, e.g. hydroxide, oxide, and alkoxide can be present.

Preparation of the compositions of my invention

The compositions of my invention can be prepared by a modification of the two-step procedure of the general type described in McMillen's U.S. Pat. No. 3,242,079 or the one-step procedure of the general type described in U.S. application Ser. No. 727,719, referred to hereinbefore. Essentially, the major difference of the procedure used to prepare my invention and the prodedure used to prepare my invention and the procedure of the patent and application is that in preparing my product all or a substantial portion of the nonvolatile diluent oil is replaced by microcrystalline wax. In order to provide a more complete teaching the two-step and one-step procedures, referred to hereinbefore, will be described in detail.

In the two-step procedure described in McMillen U.S. Pat. No. 3,242,079, there is first prepared a mineral oil solution of a carbonated, basic alkaline earth metal salt. The salt is made by carbonating a mixture of an alkaline earth metal salt of a sulfonic acid, and an alkaline earth metal base. This is theorized to develop a carbonate complex of the alkaline earth metal and the acid salt. The mixture carbonated is characterized in having a "metal ratio" of at least 4.5. The metal ratio is defined as being the ratio of the total chemical equivalents of the metal in the metal salt to the chemical equivalents of the metal which is in the form of a normal or neutral salt of the sulfonic acid employed. The complex is soluble, or may be dispersed, in mineral oil solvents. When so dispersed, there may be said to be present, an oil soluble sulfonate dispersing agent, a nonvolatile diluent oil, and an alkaline earth metal carbonate complex.

To then prepare the desired grease or rust inhibiting compositions from the mineral oil solution or dispersion of the complex, the solution or dispersion is treated with an active hydrogen compound, such as alcohol or water, or a mixture of alcohol and water. In carrying out this step of the grease preparation, the mineral oil solution should contain at least about 10 weight percent of the carbonated basic salt, and preferably at least 30 weight percent of the mineral oil. The source of the mineral oil is not critical, but the oil suitably has a viscosity ranging from 50 Saybolt Universal Seconds at 100° F. to 500 Saybolt Universal Seconds at 210° F. The amount of the active hydrogen compound or mixture of active hydrogen compounds utilized in treating the mineral oil solution is from about 1 weight percent to about 80 weight percent, based on the weight of the metal salt present (both in the neutral metal salt dispersing agent and that present in the complex). Reaction between the active hydrogen compound and the carbonated, basic alkaline earth metal salt is preferably carried out by heating the reaction mixture to reflux to drive off the volatile solvents and convert the mixture to the desired grease product. The grease products may be dissolved in a suitable light hydrocarbon solvent to form a rust inhibiting composition which can be appiled as a film or coating to metal surfaces.

In the one-step method of preparing highly basic, metal containing greases and rust inhibiting compositions as heretofore proposed, small amounts of water and alcohol are incorporated in a mixture of nonvolatile diluent oil, an alkaline earth metal-carbonate complex, and an oil soluble dispersing agent, which is preferably an alkaline earth metal salt of a sulfonic acid. In this mixture, the amount of dispersing agent utilized is generally from about 2 to about 65 weight percent, and the amount of nonvolatile diluent oil is from about 5 to about 80 weight percent. The alkaline earth metal-carbonate complex is generally present in the mixture in an amount of from about 1 to about 25 weight percent, and the water and alcohol are present in amounts of from about 1 to about 6 weight percent, and from about 1 to about 40 weight percent, respectively. In addition, the mixture may contain up to about 60 weight percent of a volatile processing solvent.

The described mixture is then heated under controlled conditions to convert the mixture to a grease or rust inhibiting composition (when cut back with a light hydrocarbon solvent). To obtain the desired products, the mixture must be heated to a temperature exceeding 50° C., and it is further very desirable to heat the mixture to above 100° C. to remove the water, alcohol and light processing solvents therefrom within a time which is practical in commercial production. It is necessary, however, in traversing the temperature zone of from about 50° C. to about 100° C., that the rate of temperature increase not exceed a certain maximum limit where the amount of water present in the mixture is less than about 2.5 moles of water per mole of alkaline earth metal present as the carbonate complex.

It should be emphasized that the processes of preparing the composition are not a part of my invention. The description of the processes has been included only to provide a more complete teaching of my invention.

Compositions prepared by the described one- and two-step procedures will contain the amount of materials described hereinbefore. When the grease compositions are dissolved in a light hydrocarbon solvent, such as Stoddard solvent, they can be applied to metal surfaces by spraying or painting to provide a relatively thick, protective coating having good rust inhibiting properties. Salt fog corrosion testing of metal surfaces coated in this manner demonstrates that the films or coatings thoroughly protect the metal over extended periods of time against corrosion due to the fog.

It has now been learned, however, that the corrosion promoting conditions imposed in the salt fog test, widely used for ascertaining susceptibility of metals to corrosion, do not provide a useful indication of the ability of films or coatings of the type described to withstand extended outdoor exposure or weathering. Thus, where mild steel materials were coated with the highly basic, metal containing rust inhibiting compositions described, and were subjected to six months southerly exposure in an outdoor location in Oklahoma, a whitening or chalking of the rust inhibitor film occurred, accompanied by the onset of corrosion as the rather brittle coating flaked off and was lost. The same chalking and flaking off of the coating occurs in a period of about two to four months in the damp rainy climate of southern Louisiana.

I have determined that the cause of this chalking and flaking of the rust inhibitor film or coating is due to the loss of the nonvolatile diluent oil or carrier material employed in the compositions described hereinbefore, and also loss of the dispersing agent. This results in the deposition of calcium carbonate (chalk) on the metal surface. The mechanism for the chalking and loss of the diluent oil and sulfonate dispersant appears to be evaporation and oxidation of the oil, the emulsification of the oil soluble sulfonate salt with rain water. The conditions giving rise to the described chalking and coating loss are the alternate periods of high temperature, intense sunlight and hard periodic rainfall which are encountered in outdoor southerly exposures for extended periods of time.

In addition, while microcrystalline waxes have always been preferred in the compositions of my invention, I have now discovered that they are so superior to paraffin waxes that my invention is now restricted to microcrystalline waxes.

As to the method of incorporating the microcrystalline wax in the compositions, I have found that this may be accomplished by including the wax in the mixutre or solution which, in the case of the two-step procedure, is reacted with an active hydrogen compound to yield the desired products, or which is, in the case of the one-step procedure, heated to convert the mixture to the desired products. Alternatively, the wax may be physically worked or mixed into the intermediate products after they have been prepared to achieve a homogeneous mixture. Where the compositions are dissolved in a volatile solvent to produce the rust inhibiting compositions of the invention, the wax may be simply dissolved or dispersed in the rust inhibiting system.

Uses for the compositions of my invention

In addition to being useful as a rust inhibitor and as a grease the compositions of my invention are also useful as a primer for conventional paints. This latter utility is described and claimed in application Ser. No. 729,875, filed May 8, 1968, now Pat. No. 3,565,672.

As indicated hereinbefore, when used as a rust inhibitor it is convenient to use a solution of the composition in a volatile solvent, preferably a hydrocarbon solvent. The resulting composition usually comprises from about 30 to about 80 weight percent of the volatile solvent and, correspondingly, from about 20 to about 70 weight percent of the viscous, high melting point composition of my invention. More usually the solution comprises from about 35 to about 65 weight percent of the volatile solvent and from about 35 to about 65 weight percent of the viscous, high melting point composition.

The term volatile solvent refers to materials having a final boiling point below about 220° C. An example of a particularly suitable hydrocarbon solvent is Stoddard solvent. Of course, it is readily apparent that other hydrocarbons, or mixtures of hydrocarbons, boiling in the desired range can be used.

In order to disclose the nature of the present invention still more clearly, the following examples, both illustrative and comparative, will be given. It is to be understood that the invention is not to be limited to the specific conditions or details set forth in these examples except insofar as such limitations are specified in the appended claims.

EXAMPLE 1

This example and Example 2 illustrate the weatherability typically exhibited by rust inhibitor films developed from rust inhibiting compositions prepared by a typical two-step procedure hereinbefore described.

A colloidal dispersion of calcium carbonate prepared by the process described in Hunt U.S. Pat. No. 3,150,088 and containing about 30 weight percent calcium sulfonate, about 43 weight percent 100 pale oil nonvolatile diluent, and having an acetic acid base number of 300 was converted to a grease by reaction with 10 weight percent water and 0.5 weight percent methoxy ethanol (methyl "Cellosolve") at 94° C. for about 1 hour in a commercial grease kettle. The volatile components of the composition were then removed by heating to 182° C. over about a one and one-half hour period. The A.S.T.M. penetration of the resultant grease at 77° C. was about 171.

The described grease product was dissolved in Stoddard solvent, a mixture of hydrocarbons having a boiling range of from about 155° C. to about 218° C. and an open cup flash point of about 41° C. The amount of the Stoddard solvent employed in the solution was 70 weight percent. A steel panel was dipped in the rust inhibiting composition (which included the grease product dissolved in the Stoddard solvent) to apply to the steel panel a film, which, upon evaporation of the solvent, had a thickness of about 0.89 mil.

In order to simulate subjection of the coated steel panel to an outdoor southerly exposure for an extended period of time, the panel was placed in an Atlas Weatherometer in which artificial accelerated weathering was made to occur. In this test, the coated metal is subjected to a "dry cycle" of 102 minutes during which bright, artificial sunlight is directed upon the metal, the temperature is about 74° C. and the relative humidity is between 60 and 70 percent. This dry cycle is followed in the Weatherometer by an artificial "rain cycle" which lasts for 18 minutes during which the steel panel is sprayed with water while artificial sunlight is directed against the panel. The temperature during the spraying is maintained at about 60° C., and the relative humidity is between 80 and 100 percent. The Atlas Weatherometer was operated continuously (24 hours a day) alternately repeating the above cycles. The 0.89 mil film deposited from the rust inhibitor composition prepared as described in this example began to undergo chalking and whitening after 1 day in the Weatherometer, and rusting of the steel panel commenced after 5 days in the Weatherometer.

EXAMPLE 2

In accordance with the process described in Hunt U.S. Pat. No. 3,150,088, a highly basic calcium sulfonate dispersion was prepared as follows:

A mixture of oil soluble sulfonic acid (which acid contained about 10 weight percent hydrocarbon oil in addition to the sulfonic acid), Stoddard solvent, n-hexane, and a small amount of a blend of 70 weight percent water and 30 weight percent methoxy ethanol was prepared. To this mixture was added, at a temperature of 30° C. to 38° C. in a period of 15 minutes, enough carbonated calcium alcoholate complex (of the type described in Hunt U.S. Pat. No. 3,150,088) to neutralize the sulfonic acid. The mixture was then overbased by concurrently adding, at a temperature of 38° C. to 40° C., a quantity of carbonated calcium alcoholate complex and a mixture of water and methoxy ethanol in a 70:30 weight ratio. The water/methoxy ethanol mixture was added in a period of 48 minutes, and the complex was added over a period of 60 minutes.

After concurrent addition of the water/methoxy ethanol mixture and the alcoholate complex, the solvents boiling below 150° C. were removed by distillation followed by about 15 minutes of stripping with carbon dioxide gas at a temperature of 150° C. The resultant dispersion contained about 30 weight percent calcium sulfonate, 5 weight percent nonvolatile hydrocarbon oil, and 38.2 percent Stoddard solvent and exhibited an acetic base number of 308.

Continuing with the two-step procedure for preparation of a rust inhibiting composition, the dispersion described in the preceding paragraph was reacted with 10 weight percent water and 1 weight percent methoxy ethanol at a reflux temperature of about 94° C. in a laboratory grease mixer for a period of 1 hour. Water and alcohol were then removed from the mixture by distillation. The resulting grease was diluted with additional Stoddard solvent until a fluid, thixotropic product was obtained which contained about 70 weight percent of the Stoddard solvent. A steel panel was then dipped in this rust inhibiting composition, and the solvent permitted to evaporate to leave a residual layer or film coating the panel, and having a thickness of 1 mil. The 1 mil film on the steel panel was then subjected to testing in the Atlas Weatherometer in the manner hereinbefore described. After a period of 1 day, the film had begun to undergo chalking and whitening and also the steel panel had commenced to rust.

EXAMPLE 3

Using the one-step method of preparation hereinbefore described, and further described in greater detail in copending application Ser. No. 727,719, a product was prepared which was a tan, thixotropic fluid containing 12 weight percent calcium sulfonate, 17.3 weight percent 100 pale oil, 60 weight percent Stoddard solvent, and having an acetic base number of about 120. This product was then diluted with Stoddard solvent to a solvent concentration of about 77 percent. A steel panel was dip coated with the rust inhibitor composition thus prepared to deposit on the panel a film having a thickness of about 1 mil. Upon subjection to weathering in the Atlas Weatherometer, chalking and whitening of the film developed after one day and rusting of the panel commenced at about the fifth day.

EXAMPLE 4

A rust inhibiting composition was prepared by a one-step procedure to prepare a product of the type and composition described in Example 5, except that the 17.3 weight percent 100 pale oil was replaced by 17.3 weight percent of a crude micro wax having a dropping point of 180° F., an oil content of about 2 weight percent, and an A.S.T.M. needle penetration of 49 at 77° F. The resulting composition was a tan, thixotropic fluid which contained about 12 weight percent calcium sulfonate, 3.3 weight percent 100 pale oil, 14 weight percent crude micro wax and 60 weight percent Stoddard solvent. The composition had an acetic base number of about 120. This product was dissolved in Stoddard solvent to provide a composition having a solvent content of 72 weight percent. The film deposited from this composition on a dip coated steel panel was about 0.8 mil thick. Upon subjecting the panel to accelerated weathering in the Atlas Weatherometer, chalking or whitening of the film commenced between the third and fourth day in the Weatheromometer, and rusting of the panel was first experienced after twelve days exposure to the weathering cycle.

This example clearly illustrates that the substitution of wax for a substantial portion of the non-volatile diluent oil conventionally employed in a rust inhibitor composition prepared by the one-step procedure markedly improves the weathering characteristic of films deposited on steel panels from such composition, and also greatly retards the onset of rusting of such panels.

EXAMPLE 5

A calcium carbonate dispersion was prepared by the procedure described in U.S. Pat. No. 3,150,088 and was identical to that described in Example 1, except that substantially all of the nonvolatile diluent oil conventionally employed in the procedure was replaced by a crude microcrystalline wax having the properties described in Example 4. The highly basic dispersion had an acetic base number of 300 and contained 30 weight percent calcium sulfonate, about 8 weight percent 100 pale oil and about 35 weight percent microcrystalline wax.

The dispersion was reacted with 10 weight percent water and 0.5 weight percent methoxy ethanol at 200° F. for about 1 hour in a commercial grease kettle. The volatile components were then removed by heating the mixture to 360° F. over about a one and one-half hour period. The resulting product was dissolved in about 60 weight percent Stoddard solvent to form a rust inhibitor composition.

Identical steel panels were then dipped in the rust inhibitor composition prepared in this example, and in a rust inhibitor composition prepared by dissolving the grease prepared in Example 1 in about 60 weight percent Stoddard solvent. To the touch, the film resulting from the composition derived from the wax containing grease was quite noticeably less sticky than the film resulting from the non-wax containing composition prepared from the grease yielded in Example 1.

EXAMPLE 6

This example is comparative and shows that microcrystalline wax is superior to paraffin wax in the compositions of my invention.

(A) Preparation of a low-oil base composition

| Materials used: | Lbs. |
|---|---|
| Sulfonic acid "A" [1] | 116.1 |
| Sulfonic acid "B" [2] | 48.2 |
| Methanol | 157.2 |
| n-Heptane | 50 |
| Xylene | 50 |
| Ca(OH)$_2$ [3] | 35 |

[1] Hexane solution of sulfonic acid prepared by sulfonation of dimer alkylate. The materials had the following analysis:

| | |
|---|---|
| Wt. percent hexane | 65.9 |
| Wt. percent nonvolatiles | 34.1 |
| Total acidity, meq./g. | 0.586 |
| Sulfonic acidity, meq./g. | 0.544 |
| Combining weight, as RSO$_3$H | 462 |
| Calculated wt. percent oil | 9.4 |

[2] Hexane solution of sulfonic acid prepared by sulfation of stripped "NAB Bottoms." The material had the following analysis:

| | |
|---|---|
| Wt. percent hexane | 62.6 |
| Wt. percent nonvolatiles | 37.4 |
| Total acidity, meq./g. | 0.626 |
| Sulfonic acidity, meq./g. | 0.595 |
| Combining weight, as RSO$_3$H | 432 |
| Calculated wt. percent oil | 11.7 |

[3] Greasemaker's lime.

Process: The sulfonic acid solutions, methanol, n-heptane, and xylene were added to a 100-gallon Pfaudler reaction vessel. The Ca(OH)$_2$ was added in approximately 1 lb. increments over a period of about 30 minutes. The resulting admixture was carbonated with 24.4 lbs. of CO$_2$ gas, added by means of a sparger tube over a period of 1 hour and 40 minutes. During the carbonation the initial temperature was 77° F., while the final temperature was 90° F.

Fourteen pounds of water were added to the carbonated admixture over an 8 minute period. The volatile solvents were then removed by heating, over a 3½ hour period to a liquid temperature of 272° F. (133° C.). During the removal of the solvents an additional 110 pounds of xylene were added to the thick, viscous product to maintain it sufficiently fluid to stir effectively. A total amount of 367.4 lbs. of solvents was recovered from the distillation.

The product had the following composition and viscosity property.

| | Wt. percent |
|---|---|
| Nonvolatiles | 44.68 |
| Volatiles (xylene) | 55.32 |
| Brookfield viscosity, at 77° F., No. 4 spindle, 12 r.p.m., 25,790 cps. | |

The nonvolatiles had the following compositions:

| | Percent |
|---|---|
| Ca sulfonate | 42.33 |
| CaCO$_3$ | 41.72 |
| Oil | 15.95 |

(B) Preparation of microcrystalline wax-containing compositions

An admixture was formed of the following materials in the amounts stated:

| | G. |
|---|---|
| Composition A | 551.0 |
| Stoddard solvent | 342.9 |
| Microcrystalline wax * | 102.0 |

*Melting point=175° F.

The resulting composition contained 29.1% of nonvolatiles and 70.9% volatiles.

A film of the compositions (nonvolatiles) was formed on steel panels by dipping, and allowing to dry, as in Example 1. The coated panels were then subjected to the Weatherometer test. The results are shown in Table I, wherein this composition is designated 6–b.

(C) Preparation of paraffin wax-containing composition

An admixture was formed of the following materials in the amounts stated:

| | G. |
|---|---|
| Composition A | 551.0 |
| Stoddard solvent | 342.9 |
| Paraffin wax * | 102.0 |

*Melting point=147° F.

The resulting composition contained 29.1% nonvolatiles and 70.9% volatiles. Compatibility of the composition was very poor, presumably due to the presence of the paraffin wax.

A film of the compositions (nonvolatiles) was formed on the steel panels by dipping, and allowing to dry, as in Example 1. The coated panels were then subjected to the Weatherometer test. The results are shown in Table I, wherein the composition is designated 6–c.

EXAMPLE 7

This example is comparative and shows the results of using various polymeric materials in the compositions instead of the microcrystalline wax.

The polymeric materials tested were the following:

| | Molecular weight |
|---|---|
| Polyisobutylene [1] | 81,000–91,000 |
| Synthetic aromatic thermoplastic hydrocarbon resin [2] | 1,400 |
| Polyterpene resin [3] | 870 |
| Isotactic polybutene [4] | 600,000–700,000 |

[1] Vistanex L–100—from Enjay Chemical Co.
[2] Piccopale 100 SF—from Pennsylvania Industrial Chemical Co.
[3] Nirez 1135—from Tenneco Chemicals, Inc.
[4] BU-TUF XB 100—from Petro-Tex, Inc.

Using composition A of Example 6 and the various polymeric materials shown above, admixtures were formed of the following materials in the amounts stated:

| | G. |
|---|---|
| Composition A | 551.0 |
| Stoddard solvent | 342.9 |
| Polymeric materials | 102.0 |

The resulting compositions contained 29.1% non-volatiles and 70.9% volatiles.

A film of the composition (nonvolatiles) was formed on steel panels by dipping, and allowing to dry, as in Example 1. The coated panels were then subjected to the Weatherometer test. The results are shown in Table I, wherein the compositions are identified as follows:

| Number: | Material |
|---|---|
| 7–a | Polyisobutylene. |
| 7–b | Synthetic aromatic thermoplastic hydrocarbon resin. |
| 7–c | Polyterpene resin. |
| 7–d | Isotactic polybutene. |

TABLE I.—WEATHEROMETER RESULTS AND OTHER PROPERTIES
Compositions of Examples 6 and 7

| Composition number | Material | Compatibility | Film thickness, mils | Film properties | Weatherometer results—relative rankings after 95 hours [1] | | |
|---|---|---|---|---|---|---|---|
| | | | | | Whitening | Rust | Other effects |
| 6–b | Microcrystalline wax | OK | 1.4±0.2 | Waxy, very slight tack | 2 | 1 | None. |
| 6–c | Paraffin wax | Poor | 1.0±0.3 | Grainy, phase separation | 3 | 3 | Do. |
| 7–a | Polyisobutylene | Fair | 1.2±0.2 | Slightly tackier than 6–b | 2 | 2 | Do. |
| 7–b | Synthetic, aromatic thermoplastic hydrocarbon resin | OK | 1.6±0.2 | Relatively hard, non-tacky | 1 | 4 | Surface cracked. |
| 7–c | Polyterpene resin | OK | 1.3±0.2 | Similar to 7–b | 1 | 1 | Surface cracked, coating very brittle. |
| 7–d | Isotactic polybutene | OK | 1.7±0.2 | do | 1 | 4 | Surface cracked. |

[1] Relative rankings: 1=best, higher numbers correspondingly poorer.

EXAMPLE 8

This example shows the preparation of a composition of my invention, wherein the microcrystalline wax is added initially, using the one-step method.

| Materials used: | Grams |
|---|---|
| Sulfonic acid (A) [1] | 1990 |
| Sulfonic acid (B) [2] | 834 |
| Methanol | 2700 |
| Stoddard solvent | 1700 |
| Microcrystalline wax [3] | 645 |
| Calcium hydroxide | 598 |
| Water | 240 |

[1] Hexane solution of sulfonic acid prepared by the sulfonation of dimer alkylate. The material had the following analysis:

| | Percent |
|---|---|
| Hexane | 65.9 |
| Sulfonic acid | 25.1 |
| Nonvolatile diluent oil | 9.0 |

[2] Hexane solution of sulfonic acid prepared by sulfonation of stripped "NAB Bottoms." The material had the following analysis:

| | Percent |
|---|---|
| Hexane | 62.3 |
| Sulfonic acid | 25.6 |
| Nonvolatile diluent Oil | 12.1 |

[3] A crude microcrystalline wax having a melting point of about 175° F.

Process: The sulfonic acid solutions and methanol were added to a 12-liter reaction vessel. After thoroughly mixing the sulfonic acids and methanol the Stoddard solvent and microcrystalline wax were added to the reaction vessel. Then the calcium hydroxide was added to the reaction vessel in small increments over a 15-minute period. The admixture in the reaction vessel was cooled to 25° C., then carbonated by blowing with $CO_2$ at a rate of approximately 12,000 cc. per minute (at 0° C., 760 mm. Hg) for 43 minutes. During carbonation the temperature was allowed to rise to a maximum of 41.5° C. after 28 minutes, then slowly decrease to 33° C. While maintaining the temperature at 33° C. the water was added over a period of 10 minutes. The admixture became very viscous. Heat was applied immediately after completion of the water addition. After two hours, at which time the temperature was 60° C. and most of the methanol and hexane had been removed by distillation, the mixture was transferred to a laboratory grease mixer for more efficient heat transfer and mixing. Solvent removal was continued by heating to a tempearture of 150° C. whereupon heating was discontinued.

The final product was an extremely viscous, thixotropic paste. Sufficient Stoddard solvent was added to bring the final product weight up to 4,000 grams. Data and analysis of the product at two concentration levels are shown below:

| | | |
|---|---|---|
| Wt. percent nonvolatiles | 55.8 | 37.0 |
| Brookfield viscosity at 77° F., 12 r.p.m., model LVT, cps | >50,000 | 9,203 |
| Base number | 213 | ~140 |
| Wt. percent Ca sulfonate | 18.5 | ~12.3 |
| Wax, percent | 16.1 | 10.7 |

EXAMPLE 9

This example illustrates the preparation of the composition of my invention, wherein the wax is added initially, using the two-step process.

(A) Preparation of intermediate product

Materials used: Grams
- Sulfonic acid A [1] — 1242.5
- Sulfonic acid B [2] — 574.5
- Microcrystalline wax [3] — 535.0
- Calcium methoxy ethoxide-carbonate complex [4] — 3190.4
- Water/methoxy ethanol/methanol azeotrope [5] — 160.0

[1] Hexane solution of sulfonic acid prepared by sulfonation of dimer alkylate. The material had the following anaysis:

| | Wt. percent |
|---|---|
| Hexane | 60.7 |
| Sulfonic acid | 28.6 |
| Nonvolatile diluent oil | 10.7 |

[2] Hexane solution of sulfonic acid prepared by sulfonation of stripped "NAB Bottoms." The material had the following analysis:

| | Wt. percent |
|---|---|
| Hexane | 62.3 |
| Sulfonic acid | 25.6 |
| Nonvolatile diluent oil | 12.1 |

[3] A recrystallized microcrystalline wax having a melting point of about 175° F.
[4] Containing 7.30% calcium.
[5] Containing 50% water, 44% methoxy ethanol and 6% methanol.

Process: The sulfonic acid solution and microcrystalline wax were added to a 12-liter reaction vessel. The admixture was heated to 40° C. whereupon 321.7 grams of the calcium methoxy ethoxide-carbonate complex were added (sufficient to neutralize the sulfonic acid). While maintaining the admixture at 45° C. the remainder of the calcium methoxy ethoxide-carbonate complex (2868.7 grams) and the azeotrope were added. The solvents were removed by heating to 150° C. and blowing with $CO_2$ gas at 150° C. for 20 minutes. During distillation, while the temperature was at about 125° C., about 1,000 grams of Stoddard solvent were added.

At the end of the distillation sufficient Stoddard solvent was added to bring the final product weight up to 4265 grams. The composition of this intermediate product was as follows:

| | |
|---|---|
| Nonvolatiles percent | 40.0 |
| Base number | ~138 |
| Ca sulfonate percent | ~12.3 |
| $CaCO_3$ do | ~12.3 |
| Oil do | ~4.7 |
| Wax do | ~12.5 |

The resulting product was a viscous, non-thixotropic fluid at room temperature and a bright, non-thixotropic fluid at 200° F.

(B) Preparation of Stoddard solvent solution of final product

The following materials were added to a 1-liter reaction vessel:

500 grams intermediate product of step A
20 grams water (10 wt. percent based on nonvolatiles)
2 grams methoxy ethanol (1 wt. percent based on nonvolatiles)

The admixture was heated to reflux (about 94° C.) for two hours. The water and methoxy ethanol were then removed by heating to 150° C. The final product weight was adjusted to 500 grams by the addition of Stoddard solvent. The product was an opaque, very viscous, thixotropic paste having the following properties:

| | |
|---|---|
| Nonvolatiles percent | 40 |
| Brookfield Viscosity at 77° F. cps | 6930 |

The invention having thus been described, what is claimed and desired to be secured by Letters Patent is:

1. A viscous, high melting point composition of matter consisting essentially of:
   (a) from about 5 to about 80 parts by weight oil soluble dispersing agent selected from the group consisting of sulfonic acids, aliphatic monocarboxylic acids, and alkaline earth metal salts thereof,
   (b) from about 5 to about 45 parts by weight alkaline earth metal carbonate, and
   (c) from about 0.5 to about 60 parts by weight microcrystalline wax having a melting point in the range of from about 145° F. to about 190° F.,
said composition being characterized as having a dropping point above 500° F., an A.S.T.M. penetration at 77° F. of less than 400, and an acetic base number of at least 50.

2. The composition of matter of claim 1 wherein the alkaline earth metal carbonate is calcium carbonate.

3. The composition of claim 2 wherein the oil soluble dispersing agent is an alkaline earth metal sulfonate.

4. The composition of claim 3 wherein the alkaline earth metal sulfonate is calcium sulfonate.

5. The composition of claim 1 characterized in that it contains additionally from about 0.5 to about 20 parts by weight nonvolatile diluent oil.

6. The composition of claim 5 wherein the alkaline earth metal carbonate is calcium carbonate.

7. The composition of claim 6 wherein the oil soluble dispersing agent is an alkaline earth metal sulfonate.

8. The composition of claim 7 wherein the alkaline earth metal sulfonate is calcium sulfonate.

9. The composition of claim 8 wherein the nonvolatile diluent oil is a mineral lubricating oil.

10. A viscous, high melting point composition of matter consisting essentially of:
    (a) from about 10 to about 60 parts by weight oil soluble dispersing agent selected from the group consisting of sulfonic acid, aliphatic monocarboxylic acids, and alkaline earth metal salts thereof,
    (b) from about 10 to about 40 parts by weight alkaline earth metal carbonate, and
    (c) from about 2 to about 55 parts by weight microcrystalline wax having a melting point in the range of from about 145° F. to about 190° F.,
said composition being characterized as having a dropping point above 500° F., an A.S.T.M. penetration at 77° F. of less than 400, and an acetic base number of at least 50.

11. The composition of matter of claim 10 wherein the alkaline earth metal carbonate is calcium carbonate.

12. The composition of claim 11 wherein the oil soluble dispersing agent is an alkaline earth metal sulfonate.

13. The composition of claim 12 wherein the alkaline earth metal sulfonate is calcium sulfonate.

14. The composition of claim 10 characterized in that it contains additionally from about 0.5 to about 20 parts by weight nonvolatile diluent oil.

15. The composition of claim 14 wherein the alkaline earth metal carbonate is calcium carbonate.

16. The composition of claim 15 wherein the oil soluble dispersing agent is an alkaline earth metal sulfonate.

17. The composition of claim 16 wherein the alkaline earth metal sulfonate is calcium sulfonate.

18. The composition of claim 17 wherein the nonvolatile diluent oil is a mineral lubricating oil.

19. A viscous, high melting point composition of matter consisting essentially of:
(a) from about 15 to about 45 parts by weight oil soluble calcium sulfonate,
(b) from about 15 to about 40 parts by weight calcium carbonate, and
(c) from about 20 to about 50 parts by weight microcrystalline wax having a melting point in the range of from about 145° F. to about 190° F.,
said composition being characterized as having a dropping point above 500° F., an A.S.T.M. penetration at 77° F. of less than 400, and an acetic base number of at least 50.

20. The composition of claim 19 characterized in that it contains additionally from about 1 to about 15 parts by weight nonvolatile diluent oil.

21. The composition of claim 20 wherein the nonvolatile diluent oil is a mineral lubricating oil.

22. A composition of matter particularly suitable for application as a rust inhibitor comprising:
(1) from about 30 to about 80 weight percent of a volatile hydrocarbon solvent having a final boiling point below about 220° C., and
(2) from about 20 to about 70 weight percent of a viscous, high melting point composition consisting essentially of:
(a) from about 5 to about 80 parts by weight oil soluble dispersing agent selected from the group consisting of sulfonic acids, aliphatic carboxylic acids, and alkaline earth metal salts thereof,
(b) from about 5 to about 45 parts by weight alkaline earth metal carbonate, and
(c) from about 0.5 to about 60 parts by weight microcrystalline wax having a melting point in the range of from about 145° F. to about 190° F.

23. The composition of claim 22 wherein the alkaline earth metal carbonate is calcium carbonate.

24. The composition of claim 23 wherein the oil soluble dispersing agent is an alkaline earth metal sulfonate.

25. The composition of claim 24 wherein the alkaline earth metal sulfonate is calcium sulfonate.

26. The composition of claim 25 characterized in that the viscous, high melting point composition contains additionally from about 0.5 to about 20 parts by weight nonvolatile diluent oil.

References Cited
UNITED STATES PATENTS

| | | | |
|---|---|---|---|
| 3,242,009 | 3/1966 | McMillen | 252—33 |
| 3,150,088 | 9/1964 | Hunt et al. | 252—33 |
| 3,065,173 | 11/1962 | Blake et al. | 252—25 |

DANIEL E. WYMAN, Primary Examiner

I. VAUGHN, Assistant Examiner

U.S. Cl. X.R.

106—14; 117—72, 75, 89, 92; 252—18, 39, 59, 389